(12) United States Patent
Kinast

(10) Patent No.: US 11,457,553 B2
(45) Date of Patent: Oct. 4, 2022

(54) AGRICULTURAL APPARATUS

(71) Applicant: AGCO International GmbH, Neuhausen (CH)

(72) Inventor: Ronnie Kinast, Ilschwang (DE)

(73) Assignee: AGCO International GmbH, Neuhausen (CH)

( * ) Notice: Subject to any disclaimer, the term of this patent is extended or adjusted under 35 U.S.C. 154(b) by 541 days.

(21) Appl. No.: 16/601,126

(22) Filed: Oct. 14, 2019

(65) Prior Publication Data

US 2020/0113119 A1 Apr. 16, 2020

(30) Foreign Application Priority Data

Oct. 12, 2018 (GB) ..................................... 1816626

(51) Int. Cl.
*A01B 73/04* (2006.01)
*A01B 59/06* (2006.01)
(Continued)

(52) U.S. Cl.
CPC .......... *A01B 73/044* (2013.01); *A01B 59/066* (2013.01); *A01D 34/64* (2013.01); *A01D 2101/00* (2013.01)

(58) Field of Classification Search
CPC .... A01B 73/044; A01B 59/066; A01D 34/64; A01D 2101/00
(Continued)

(56) References Cited

U.S. PATENT DOCUMENTS 5,950,735 A * 9/1999 Godbersen ........... A01B 59/062
 37/468
9,485,899 B2 * 11/2016 Ribo .................... A01B 59/062
(Continued)

FOREIGN PATENT DOCUMENTS

DE  10 2011 103348 B3  10/2012
EP       2457431 A1   5/2012
EP       2644015 A2  10/2013

OTHER PUBLICATIONS

UK Intellectual Property Office, Search Report for Priority Application No. GB1816626.4, dated Apr. 10, 2019.
(Continued)

*Primary Examiner* — Toan C To

(57) ABSTRACT

A towed agricultural implement including a main chassis member, a moveable arm for carrying at least one working implement located to each side of the main chassis member, each moveable arm being moveable between a working position and a transport position, the main chassis member having a support device for attachment to a towing vehicle, the support device having left and right lower attachment points for attaching to lower mounting points of a three point hitch of a towing vehicle and a central upper attachment point for attaching to the upper mounting point of the three point hitch, in which each left and right attachment point is mounted on an articulated arm connected to the main chassis member, the main chassis member further including a regulating control apparatus to secure and release a free end of each articulated arm in an operative position. This construction has as an advantage that on encountering an obstacle the articulated arm can be released allowing the working implement to move away from the obstacle.

11 Claims, 5 Drawing Sheets

(51) Int. Cl.
  *A01D 34/64* (2006.01)
  *A01D 101/00* (2006.01)

(58) Field of Classification Search
  USPC .................................... 172/272, 275, 810
  See application file for complete search history.

(56) References Cited

U.S. PATENT DOCUMENTS

| | | |
|---|---|---|
| 9,615,498 B2 | 4/2017 | Speich et al. |
| 10,570,581 B2 * | 2/2020 | Faivre .................. E02F 3/3695 |
| 2012/0279734 A1 | 11/2012 | Oudemans |
| 2015/0230388 A1 * | 8/2015 | Ribo .................... A01B 59/062 |
| | | 248/653 |
| 2018/0295770 A1 * | 10/2018 | Friggstad ............. A01B 73/005 |

OTHER PUBLICATIONS

European Patent Office, Search Report for Related EP Application No. 19190674.2, dated Mar. 19, 2020.

* cited by examiner

AGRICULTURAL APPARATUS

BACKGROUND

Field of Invention

The present invention relates to an improved agricultural implement, in particular a towed agricultural implement such as a mowing machine for mowing an agricultural crop.

Description of Related Art

It is known to provide towed agricultural implements, such as mowers, which may be towed from an agricultural vehicle, such as a tractor. Such towed agricultural implements include left hand side and right hand side working implements for processing a crop, the working implements being carried from a central towing structure. The working implements may be moved between a substantially horizontal orientation in a working position and a substantially vertical orientation in a transport position. In this way a broad working width may be obtained, while retaining a narrow width during transport on public highways. In triple combinations a further working implement is provided at the front of the agricultural implement to process the crop to the front of the agricultural vehicle.

The towed agricultural implement may conveniently be mounted to the three point hitch of the agricultural vehicle. It is known to provide various mechanisms that allow for the mowing device to yield when a rigid obstacle, for example a manhole cover, tree stump, stone or the like is encountered.

It is an advantage of the present invention that it provides a further solution to the problem of protecting the working implement when such an obstacle is encountered.

BRIEF SUMMARY OF THE INVENTION

According to first aspect of the invention, a towed agricultural implement comprises a main chassis member, a moveable arm for carrying at least one working implement located to each side of the main chassis member, each moveable arm being moveable between a working position and a transport position, the main chassis member having a support device for attachment to a towing vehicle, the support device comprising left and right lower attachment points for attaching to lower mounting points of a three point hitch of a towing vehicle and a central upper attachment point for attaching to the upper mounting point of the three point hitch, characterised in that each left and right attachment point is mounted on an articulated arm connected to the main chassis member, the main chassis member further comprising a regulating control apparatus adapted releasably to secure a free end of each articulated arm in an operative position.

This construction has as an advantage that on encountering an obstacle one (or both) of the articulated arms can be released from the regulating control apparatus allowing the main chassis member, the moveable arm(s) and working implement(s) carried on the moveable arm(s) to move away from the obstacle.

Preferably, the regulating control apparatus permits movement of the main chassis member between the operative position and an outwardly displaced position. This has as an advantage that movement of the towed agricultural implement away from the obstacle is permitted retaining the support device on the towing vehicle.

Preferably, a free end of the articulated arm includes a fastening member for cooperation with the regulating control apparatus.

Preferably, the regulating control apparatus further comprises displaceable arms.

More preferably, the regulating control apparatus further comprises biasing means urging the displaceable arms into a first position.

Still more preferably, the biasing means comprises elastomeric springs.

Preferably, the displaceable arms are pivotable about a fixed point relative to the main chassis member.

Preferably the displaceable arms include guide surfaces. More preferably, the guide surfaces comprise curved guide surfaces.

More preferably, the displaceable arms further include linear guide surfaces.

Preferably, the working implement is a disc mower or a drum mower.

BRIEF DESCRIPTION OF THE DRAWINGS

The invention will now be described, by way of example only, with reference to the accompanying drawings, in which.

DETAILED DESCRIPTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Reference to terms such as longitudinal, transverse and vertical are made with respect to a longitudinal vehicle axis which is parallel to a normal forward direction of travel. Reference to the front and rear are made with reference to a normal forward direction of travel unless the context indicates otherwise.

Figure 1:
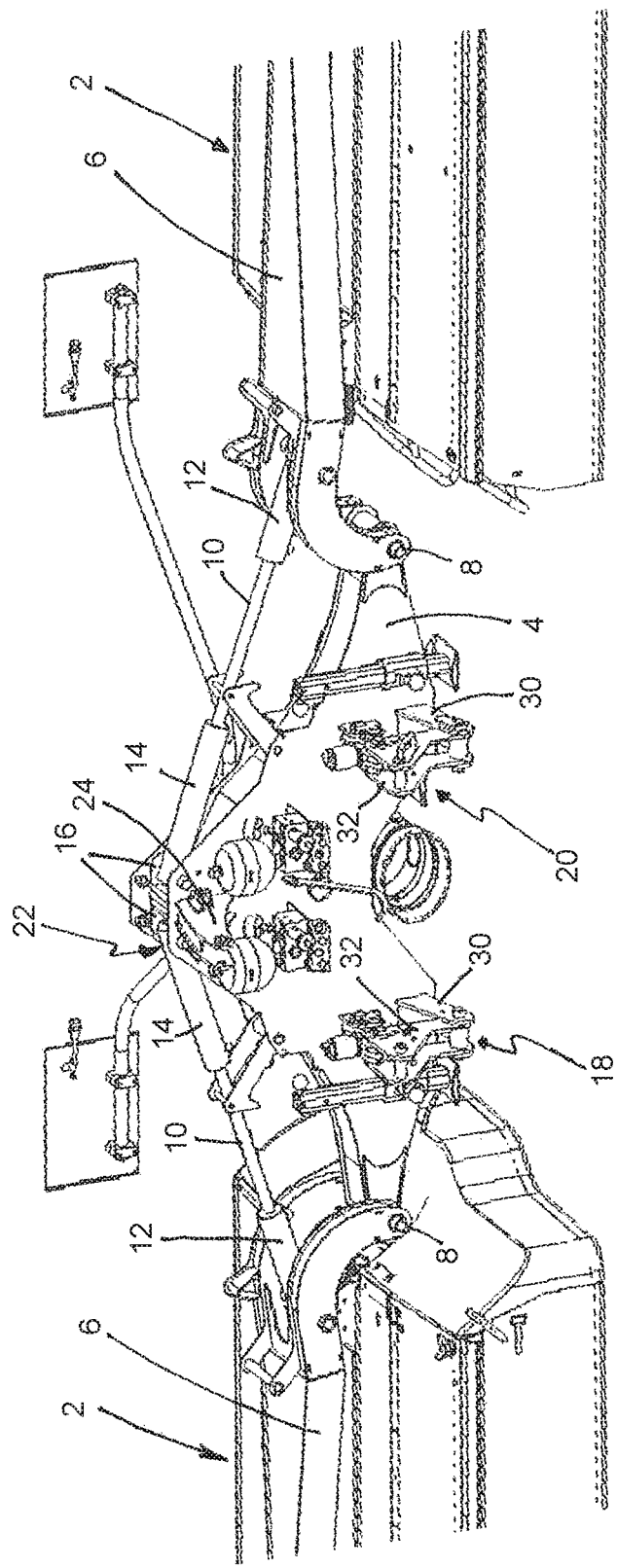
FIG. 1 shows a perspective view of part of an example towed agricultural implement in accordance with the present invention for mounting on a towing vehicle.
Figure 2:
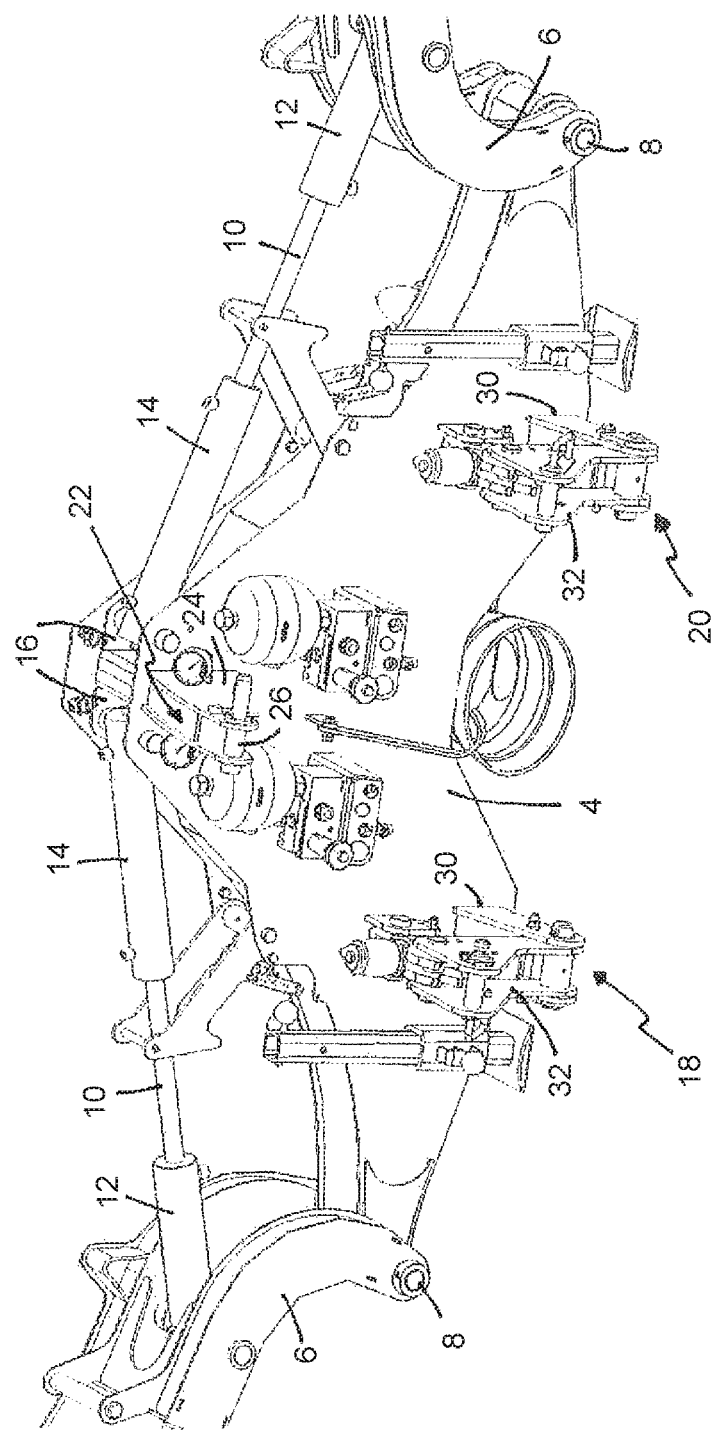
FIG. 2 shows a more detailed view of part of the example towed agricultural implement of FIG. 1 with a number of parts removed for clarity.

With reference to FIGS. 1 and 2, part of a towed agricultural implement is shown. A main chassis member 4 has an arm 6 carried to each side of the main chassis member 4. It will be understood that in normal operation the towed agricultural implement is symmetrical about a longitudinal axis and that the left and right hand sides of the implement correspond and so reference to a part on one side will include a reference to a like part on the other side unless stated to the contrary.

Each arm 6 carries a working implement 2. The working implement 2 may conveniently comprise a mower such as a disc mower or a drum mower. Each arm 6 is mounted to the main chassis member 4 by way of a pivot 8 and a hydraulic cylinder 10.

The hydraulic cylinder 10 is mounted at a first end 12 to the arm 6 and at a second end 14 to a mounting point 16 provided toward a centre of the main chassis member 4. Adjustment of the hydraulic cylinder 10 will cause the arm 6 to be raised between a lower generally horizontal working position (corresponding to that of FIG. 1) and a generally vertical transport position (not shown).

The front of the main chassis member 4 is provided with a support device for attachment to a towing vehicle, such as a tractor. The support device can be seen to comprise lower left and right attachment points 18,20 as well as a central upper attachment point 22 for attaching to the three links of a three point lifting device of the towing vehicle.

The central upper attachment point 22 comprises a bracket 24 mounted to the main chassis member 4. A bolt or pin 26 extends between free ends of the bracket and serves as a pivot for the main chassis member in the manner described below.

Figure 3A:
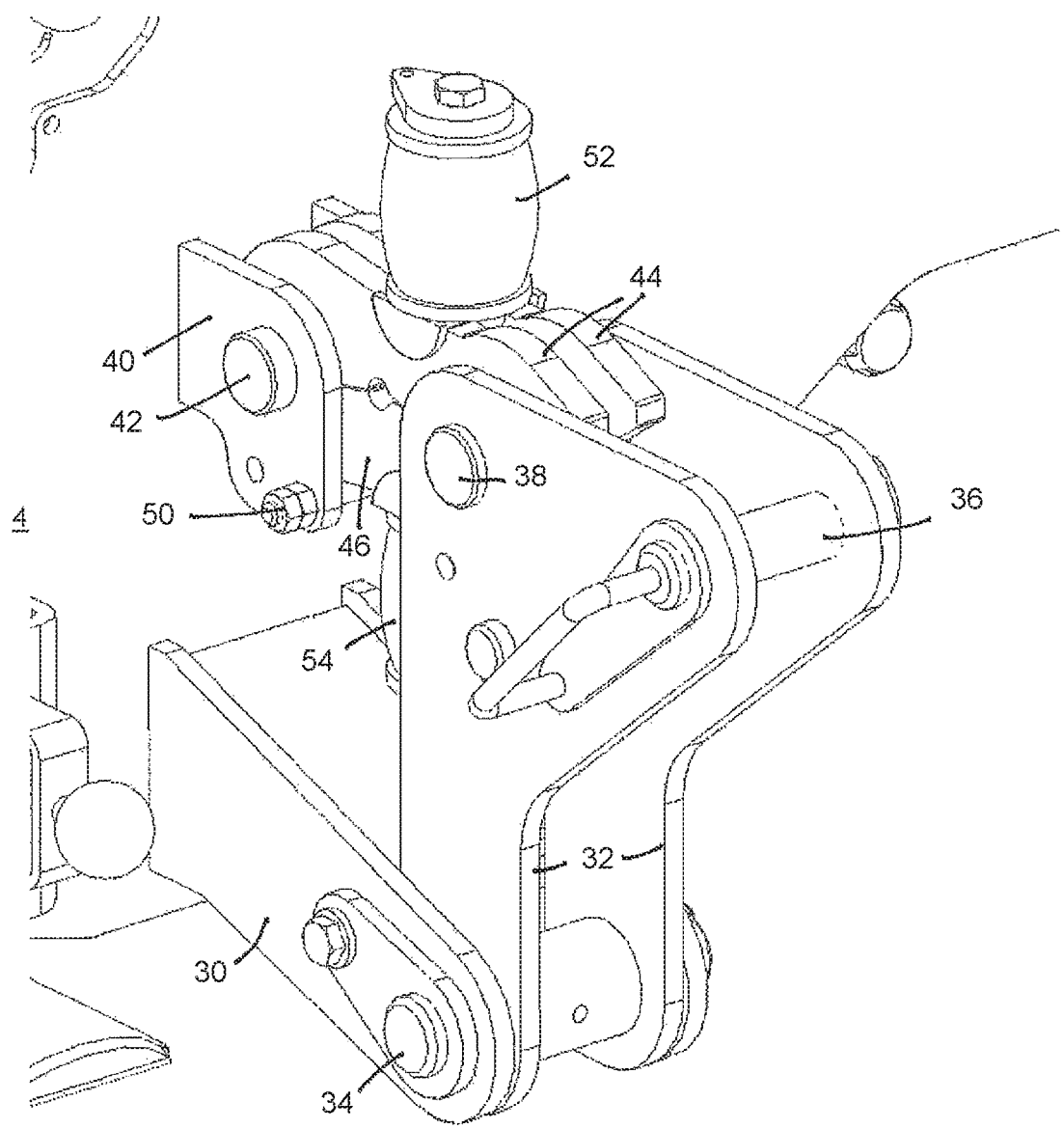
FIG. 3A shows a detail illustrating one of the attachment points of FIG. 1 in a neutral retained position.
Figure 3B:
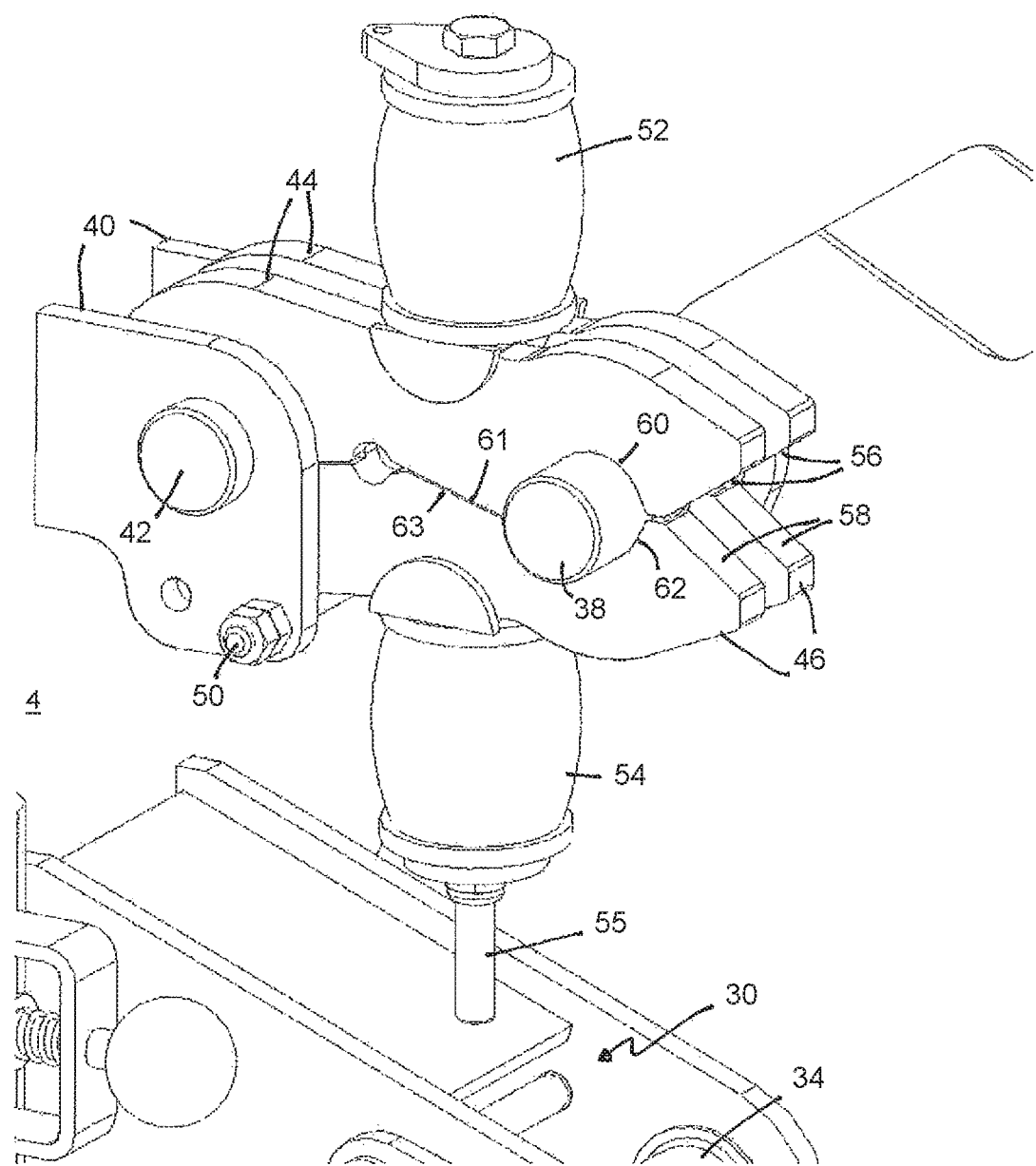
FIG. 3B shows a view similar to FIG. 3A with a number of parts removed for clarity.
Figure 4:
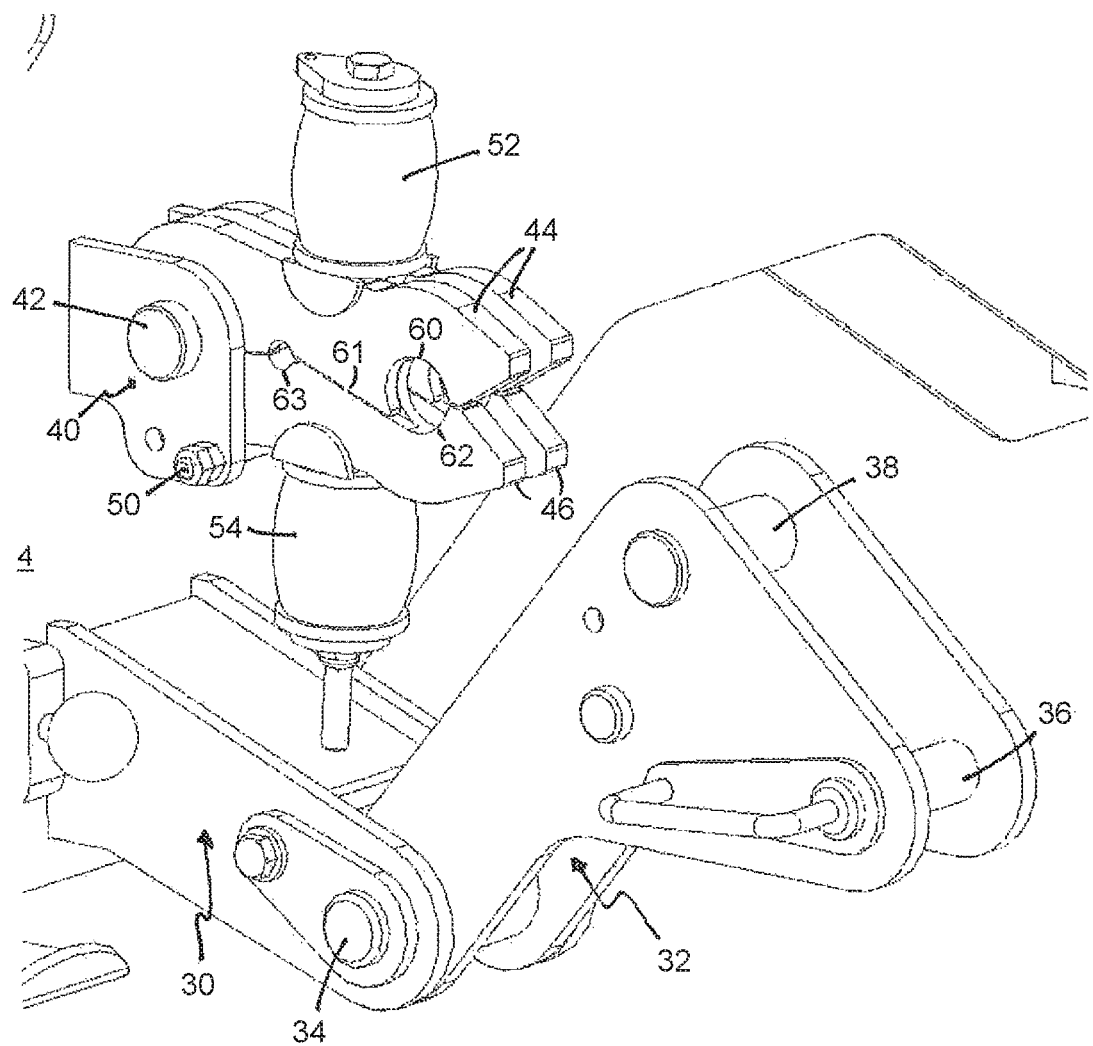
FIG. 4 shows a view similar to FIG. 3A illustrating the attachment point in a released position.

Each of the lower attachment points 18,20 includes a lower articulated arm connected to the main chassis member 4 and are described in more detail by reference to FIGS. 3A, 3B and FIG. 4. In the illustrated embodiment, each lower articulated arm comprises a parallel sided fixed lower member 30 connected to the main chassis member 4 and a lower parallel sided adjustable link member 32 connected at a lower portion to the fixed lower member 30 by a pivot joint 34. An upper portion of the lower adjustable link member 32 is provided between its parallel sides toward the front with a bolt or pin 36 to serve as the attachment point and toward the rear with a fastening member, such as a bolt or pin 38.

The main chassis member 4 further includes a regulating control apparatus. Conveniently, as in the illustrated embodiment, a separate regulating control apparatus is provided for each attachment point 18,20 and is aligned with said associated attachment point 18,20.

The regulating control apparatus conveniently comprises a parallel sided fixed mounting point 40 such as a bracket attached to the main chassis member 4. A pivot pin 42 is provided on the fixed mounting point. The pivot pin 42 carries an upper displaceable arm 44 and a lower displaceable arm 46. In the illustrated embodiment, each of the upper displaceable arm 44 and a lower displaceable arm 46 comprise two parallel sided elements functioning as a unitary body. The upper and lower displaceable arms 44,46 are adapted to rotate about the pivot pin 42 in opposing directions. A support bar 50 extends across the mounting point 40 to act as a limit to the movement of the lower displaceable arm 46.

The upper and lower displaceable arms 44,46 are urged together by a suitable biasing means. In the illustrated embodiment the biasing means comprises upper and lower elastomeric springs 52,54 connected by way of a central generally vertical tie rod 55.

The free end of the lower surface of the upper displaceable arm 44 is provided with an inward downwardly directed linear sloping surface 56. A corresponding part of the upper surface of the lower displaceable arm 46 is provided with an inward upwardly directed linear sloping surface 58.

Inward of the sloping surface 56, the upper displaceable arm 44 is provided with an arcuate surface 60. Inward of the arcuate surface 60 the lower surface includes a generally planar region 61 extending toward the pivot pin 42. Inward of the sloping surface 58, the lower displaceable arm 46 is provided with an arcuate surface 62 flowing into a generally planar region 63 extending toward the pivot pin 52.

The biasing means 52,54 urge the generally planar regions 61,63 together such that the arcuate surfaces 60,62 define a generally circular opening. In FIGS. 2A and 2B it can be seen that the fastening member 38 is retained within the generally circular opening when the upper and lower displaceable arms 44,46 are urged together. It will be understood that this is the normal operating position of the support device.

When one of the working implements encounters a rigid obstacle, such as a manhole cover, tree stump, stone or the like, the working implement can be pivoted backward that is against the direction of travel and away from the towing vehicle. The attachment points 18,20,22 will be held by the three point hitch such that the fastening member 38 adjacent the obstacle is urged away from the pivot pin 42 and out of the upper and lower displaceable arms 44,46 (cf the left side of FIG. 1). If the force is high enough the upper and lower displaceable arms 44,46 are displaced allowing the fastening member 38 to exit the upper and lower displaceable arms 44,46 and the lower adjustable link member 32 to rotate about the pivot joint 34 (FIG. 3) thereby allowing the main chassis member 4 adjacent the obstacle to pivot backward as the lower adjustable link member 32 is no longer held in the normal operating position.

On the side of the main chassis member 4 opposite the obstacle the fastening member 38 is urged towards the pivot pin 42. The shape of the upper surface 60 is designed to prevent inward movement of the fastening member 38. As a result, the apparatus as a whole will pivot about a vertical axis aligned with this fastening member 38 as on this side the lower link members 30 and 32 are held in a fixed longitudinal relationship between the adjacent part of the main chassis member 4 and the associated lower link of the three point hitch of the towing vehicle and on the obstacle side movement of the lower link members 30 and 32 extends longitudinal spacing between the adjacent part of the main chassis member 4 and the associated lower link of the three point hitch of the towing vehicle.

The fastening member 38 on the obstacle side may be returned to the normal operating position by pushing it between the sloping surfaces 56,58 of the upper and lower arms 44,46 against the action of the biasing means. In use, this happens automatically due to the weight of the towed agricultural implement.

The starting positions of each of the attachment points 18,20,22—that is their normal operating position—is fixed in relation to the main chassis member 4.

From reading the present disclosure, other modifications will be apparent to persons skilled in the art. Such modifications may involve other features which are already known in the field of towed agricultural mowers and component parts therefore and which may be used instead of or in addition to features already described herein.

The invention claimed is:

1. A towed agricultural implement comprising:
   a main chassis member, and
   a moveable arm located on each side of the main chassis member for carrying at least one working implement, each moveable arm being moveable between a working position and a transport position, the main chassis member having a support device configured to attach to a three point hitch of a tow vehicle, the support device comprising left and right lower attachment points for attaching to lower mounting points of the three point hitch and a central upper attachment point for attaching to an upper mounting point of the three point hitch, wherein each of the left and right attachment points is mounted on an articulating arm connected to the main chassis member, the main chassis member further comprising a regulating control apparatus configured to releasably secure a free end of each articulating arm in an operative position.

2. The towed agricultural implement of claim 1, wherein the regulating control apparatus is configured to allow movement of the main chassis member between the operative position and an outwardly displaced position.

3. The towed agricultural implement of claim 1, wherein the free end of the each articulating arm comprises a fastening member for attaching to the regulating control apparatus.

4. The towed agricultural implement of claim 1, wherein the regulating control apparatus further comprises displaceable arms.

5. The towed agricultural implement of claim 4, wherein the regulating control apparatus further comprises a biasing mechanism urging the displaceable arms into a first position.

6. The towed agricultural implement of claim 5, wherein the biasing mechanism comprises elastomeric springs.

7. The towed agricultural implement of claim 4, wherein the displaceable arms are pivotable about a fixed point relative to the main chassis member.

8. The towed agricultural implement of claim 4, wherein the displaceable arms include guide surfaces.

9. The towed agricultural implement of claim 8, wherein the guide surfaces are curved.

10. The towed agricultural implement of claim 9, wherein the displaceable arms further comprise linear guide surfaces.

11. The towed agricultural implement of claim 1, wherein the working implement is a disc mower or a drum mower.

* * * * *